(12) United States Patent
Thompson et al.

(10) Patent No.: US 7,315,544 B2
(45) Date of Patent: Jan. 1, 2008

(54) GLOBAL SEQUENCE NUMBERS IN WIRELESS COMMUNICATIONS SYSTEMS AND METHODS

(75) Inventors: David Thompson, Austin, TX (US); James Chou, Leander, TX (US); Lin Shi, Randolph, NJ (US)

(73) Assignee: ByteMobile, Inc.

( * ) Notice: Subject to any disclaimer, the term of this patent is extended or adjusted under 35 U.S.C. 154(b) by 669 days.

(21) Appl. No.: 09/982,510

(22) Filed: Oct. 17, 2001

(65) Prior Publication Data

US 2002/0058474 A1    May 16, 2002

Related U.S. Application Data

(60) Provisional application No. 60/241,087, filed on Oct. 17, 2000.

(51) Int. Cl.
*H04L 12/28*    (2006.01)
*H04B 7/216*    (2006.01)
*H04J 3/24*    (2006.01)

(52) U.S. Cl. .................. 370/394; 370/473; 370/342
(58) Field of Classification Search .................. 370/394
See application file for complete search history.

(56) References Cited

U.S. PATENT DOCUMENTS 6,032,197 A * 2/2000 Birdwell et al. ............ 709/247
6,507,582 B1 * 1/2003 Abrol ......................... 370/394
6,807,648 B1 * 10/2004 Cansever et al. ........... 714/776
2001/0032254 A1 * 10/2001 Hawkins ..................... 709/219
2002/0057709 A1 * 5/2002 Edmon et al. .............. 370/442

* cited by examiner

*Primary Examiner*—Fan Tsang
*Assistant Examiner*—Joseph T Phan
(74) *Attorney, Agent, or Firm*—The Law Firm of H. Dale Langley, Jr. P.C.

(57) ABSTRACT

A communication provider which provides wireless access to a packetized data network, such as the Internet. The provider includes a server computer. The server computer is connected to the network, which is at least in part a wired network. A client device is also connected to the network, including by wireless means. The wired network is connected to a cellular wireless communications system. Payloads of information communicated by the server computer to the client device are assigned corresponding Global Sequence Numbers. By determining a time differential between next succeeding payloads received by the client, a determination is made whether any payload loss occurs on a wired portion of the network or on a wireless portion of the network. Headers of all payloads of information are compressed together and transmitted together, in order to limit communications and amount of data communicated. A send rate of the server computer is adjusted in relation to an effective receive rate of the client device.

6 Claims, 4 Drawing Sheets

GLOBAL SEQUENCE NUMBERS IN WIRELESS COMMUNICATIONS SYSTEMS AND METHODS

CROSS-REFERENCE TO RELATED APPLICATIONS

This application is related to U.S. Provisional Patent Application No. 60/241,087 titled "Wireless Communications Protocols and Architectures Systems and Methods", filed Oct. 17, 2000, co-pending herewith and which is hereby incorporated herein by this reference.

BACKGROUND OF THE INVENTION

The present invention generally relates to wireless communications systems and methods and, more particularly, relates to network protocols and architectures for wireless application service provider (ASP) systems and methods.

Wireless data communications present different and additional problems than those experienced in wired data communications. These problems of wireless data communications include the dynamic conditions of wireless channels, such as noise and distortion, air packet loss, channel speeds and efficiencies, and reliability. Optimum and effective wireless ASP systems and methods employing conventional networks and communications protocols, such as, for example, the Internet and Transport Control Protocol/Internet Protocol (TCP/IP), have limitations and restraints in wireless environments.

Efforts have typically been directed primarily at improving speeds of wireless transmissions, for example, in packetized data networks with CDPD wireless capabilities. These efforts have involved focus on choices of channels, modem transmission speed capabilities, and bandwidth availabilities and usage. The conventional protocols and architectures of communications networks, for example, the Internet and its predominant TCP/IP protocols, have not altered or changed from standards, in order to improve such communications. The prevailing views have apparently been to work within the adopted standards, not to exploit proprietary possibilities.

Conventional packetized data communications protocols and network architectures, however, were developed primarily for use in wired networks and conditions. The protocols and networks, therefore, tend to fail to account and adjust for the different and additional problems presented for communications in wireless environments, particularly those previously mentioned. The various aspects of standardized protocols and networks can be counterproductive, or deleterious even, because of characteristics and problems of wireless communications. Wireless ASP systems and methods that utilize only standardized protocols and networks are hampered in optimization and effectiveness for these reasons.

It would be a significant improvement in the art and technology to provide improved protocols and networks for packetized data communications, such as over the Internet and other networks, and to provide wireless ASP services through systems and methods using those improved protocols and networks.

SUMMARY OF THE INVENTION

An embodiment of the invention is a wireless communications network for communicating at least one data payload. The network includes a wired network, a wireless channel, a wireless application service provider server computer connected to the wired network, a wireless packetized data communications provider equipment connected to the wired network, and a client device communicatively connected via the wireless channel to the wireless packetized data communications provider. The server computer assigns a global sequence number to each payload. The global sequence number allows determinations such as whether any payload has not been received by the client device because of the sequence any missing number of the sequence.

Another embodiment of the invention is a wireless communications network including a compressor for compressing together headers of each payload. The compressed together headers are transmitted together in communications.

Yet another embodiment of the invention is a wireless communications network including a comparator. The comparator determines whether a time differential between receipts by a client device of every other sequential payload exceeds a time constant indicative of an effective data receipt rate of the client device.

Another embodiment of the invention is a wireless communications network including a bundling rate determiner at a client device. An outstanding number of bytes not yet received by the client device is divided by an effective data receipt rate of the client device. A server computer adjusts a send rate of the server computer based on a multiple of the result of the division.

Yet another embodiment of the invention is a method of wireless communications. The method includes assigning each data payload a global sequence number.

Another embodiment of the invention is a method of wireless communications. The method includes receiving each of next successive payloads, determining a time differential between receipts of the next successive payloads, and comparing the time differential to a multiple of a server transmit rate. If the time differential exceeds the multiple then payload loss is assumed occurring on a wireless portion of a network, and otherwise on a wired portion of the network.

A further embodiment of the invention is a method of wireless communications in which all headers of data payloads are compressed and transmitted together.

Another embodiment of the invention is a method of wireless communications. The method includes determining at a client device the number of bytes outstanding not yet received, dividing the number of bytes by an effective receipt data rate of the client device, and varying a send rate of a server computer according to a multiple of the result of the step of dividing.

BRIEF DESCRIPTION OF THE DRAWINGS

The present invention is illustrated by way of example and not limitation in the accompanying figures, in which like references indicate similar elements, and in which.

DETAILED DESCRIPTION OF PREFERRED EMBODIMENTS

Wireless ASP

Figure 1:
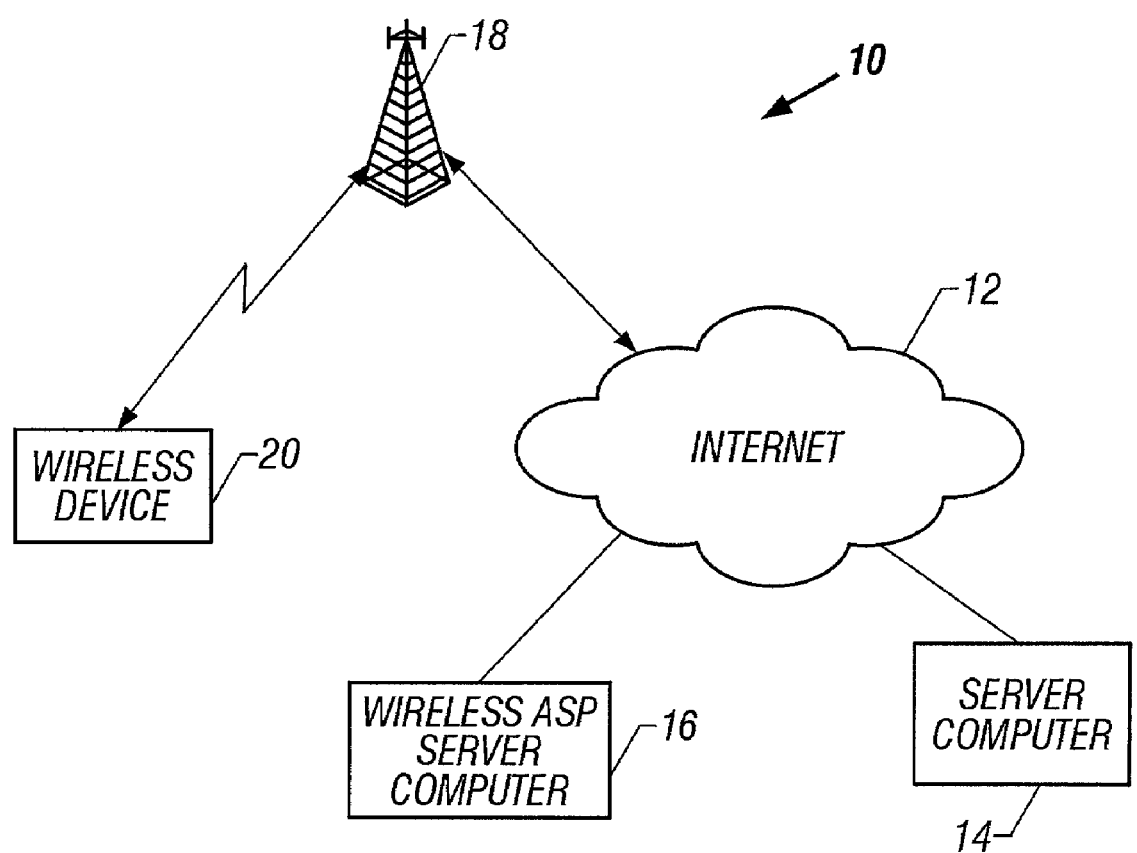
FIG. 1 illustrates a wireless application service provider (ASP) system.

Referring to FIG. 1, a system 10 serves as a wireless application service provider (ASP). The system 10 includes a network, such as the Internet 12. The network is operable according to a packetized data protocol, such as transport control protocol/Internet protocol (TCP/IP) or some other network protocol. The network, such as the Internet 12, interconnects various computing and communications devices, for example, among other devices, a server computer 14 and a wireless ASP server computer 16. The server computer 14 and the wireless ASP server computer 16 are each one or more server computers including a microprocessor, memory storage, and communications capabilities via wire or wireless connection with the Internet 12. The server computer 14 and the wireless ASP server computer 16 communicate over the Internet 12 or other network via the protocol of the network.

The network, such as the Internet 12, is also connected with a wireless communications service provider 18. The wireless communications service provider 18 is, for example, a cellular or other packetized data wireless communications network. The wireless service provider 18 connects by wire connection with the network, such as the Internet 12. Alternatively, the wireless communications service provider 18 could connect with the network 12 by other communications connection, such as fiber optic, coax cable, wireless channel, or other communications connection. Furthermore, although the wireless communications service provider 18 is illustrated as a single particular communications channel, multiple links and multiple channels of those links, for example, communications links of wired and wireless channels, can alternatively provide the same functions and are included for purposes of the description.

The wireless service provider 18 is capable of communicating through wireless channels with various devices, such as a wireless device 20. The wireless device 20 is a processing device, such as a data-enabled cellular telephone, a personal digital assistant, a laptop computer, or any of a wide variety of other processing devices that can wirelessly communicate with the wireless service provider 18. Of course, the wireless device 20 includes communications equipment for accomplishing the wireless communication with the wireless service provider 18, such as wireless modem.

The wireless device 20 communicates through the wireless service provider 18 and over the network, such as the Internet 12, with the wireless ASP server computer 16. The wireless ASP server computer 16 serves as a dedicated server for the wireless device 20 in its communications. The wireless ASP server computer 16 sends and receives communications to and from the wireless device 20 over the network, such as the Internet 12, and on through the wireless service provider 18. The wireless ASP server computer 16 also communicates over the network, such as the Internet 12, with other network connected devices, such as the server computer 14, via protocols in communications channels enabled for such communications on the network. In certain embodiments, for example, the wireless ASP server computer 16 and the wireless device 20 communicate with specialized protocols, such as optimized packetized data protocols, for example, optimized TCP/IP protocols or other protocols such as described in the related patent applications.

Global Sequence Numbers

Figure 2:
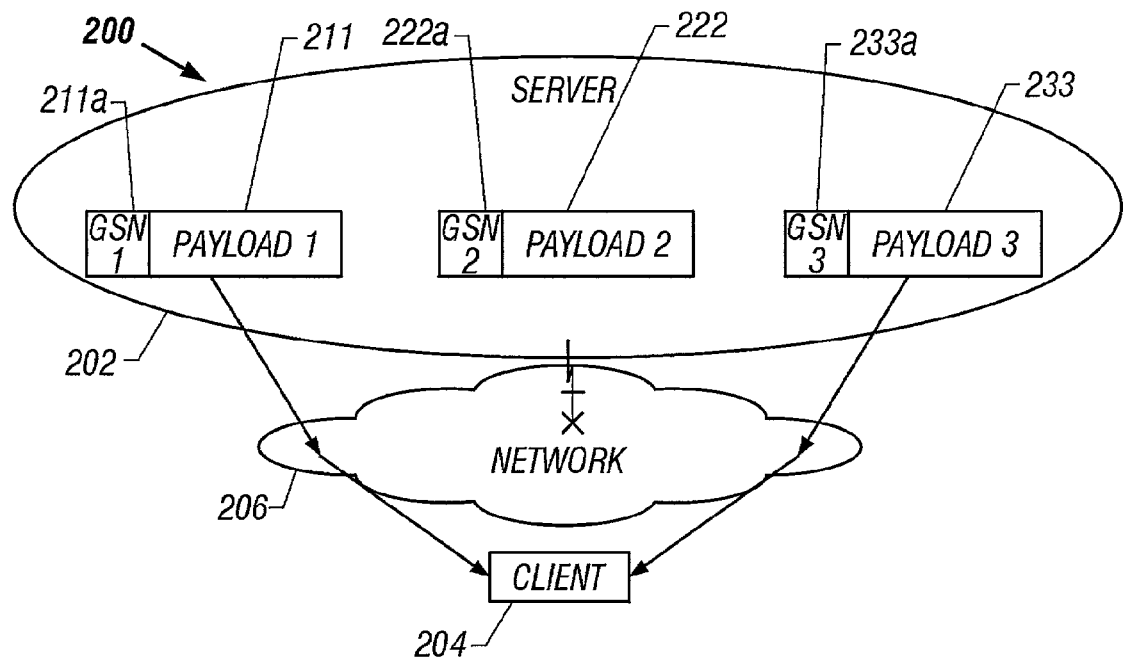
FIG. 2 illustrates a client-server network wherein data payloads sent are each identified by a unique Global Sequence Number according to embodiments of the present invention.

Referring to FIG. 2, a client-server system 200, such as the wireless ASP system 10 of FIG. 1, includes server 202, a client 204 and a network 206 connecting the server 202 and the client 204. The server 202 and the client 204 are any communications devices capable of communicating packetized data over the network 206, according to the protocols of the network 206. The network 206 is any communications channels or connections which enable communications between the client 204 and the server 206, such as, for example, the Internet, and can be wired, wireless or other.

The server 202 has or obtains information for communication to the client 204, which information is organized in payloads 211, 222, 233—e.g., Payload1, Payload2, and Payload3. The payloads 211, 222, 233 can correspond to different elements or data types of a web page, or other information that is separately arranged in files or payloads for delivery over the network 206 according to the protocols, standard or proprietary, of the network 206. At the server 202, each payload 211, 222, 233 is assigned a corresponding Global Sequence Number (GSN) 211a, 222a, 233a. Each GSN 211a, 222a, 233a is included with the respective payload 211, 222, 233 by the server 202.

As is conventional, each payload 211, 222, 233 is formatted in respective data packets, each having control and header information, and the data packets are communicated in bursts over the network 206. The GSN 211a, 222a, 233a of each payload 211, 222, 233 is included with the payload data and is, thus, formatted together with the payload data and transmitted by the server 202 over the network 206 to the client 204. Although only the three payloads 211, 222, 233 are illustrated in FIG. 2, the actual number of payloads will depend on the particular information being communicated between the client 204 and the server 202 and the particular illustration here is for example purposes only. In any event, each payload is assigned a Global Sequence Number by the server 202 and transmitted together with the corresponding GSN to the client 204 over the network 206.

In FIG. 2, the transmissions by the server 202 to the client 204 are illustrated by arrows passing through the network 206. It is notable that the arrow corresponding to Payload 2 is terminated prior to reaching the client 204. This indicates that, although Payload 1 and Payload 3 reach the client 204 upon transmission by the server 202, Payload 2 is lost. Payloads can be lost at any point in he system 200, for example, payloads can be lost on the network 206. Payloads could also be lost because of actions or inactions of the server 202 or the client 204, however, the present description is primarily focused on payloads lost in transmit from the server 202 to the client 204.

If the network 206 is comprised of multiple types of physical connectors, for example, both wired and wireless segments, as in the case of the wireless ASP system 10 of FIG. 1, it can be beneficial to learn in which of the various physical connectors any data loss occurs, for example, whether the loss occurs in the wired or wireless portions. As hereinafter described, the GSN allows the client 204 and the server 202 to make such determination and to compensate for and alleviate such losses by dynamically changing conditions, using alternative channels, or other possibilities.

Source of Loss Determinations

Figure 3:
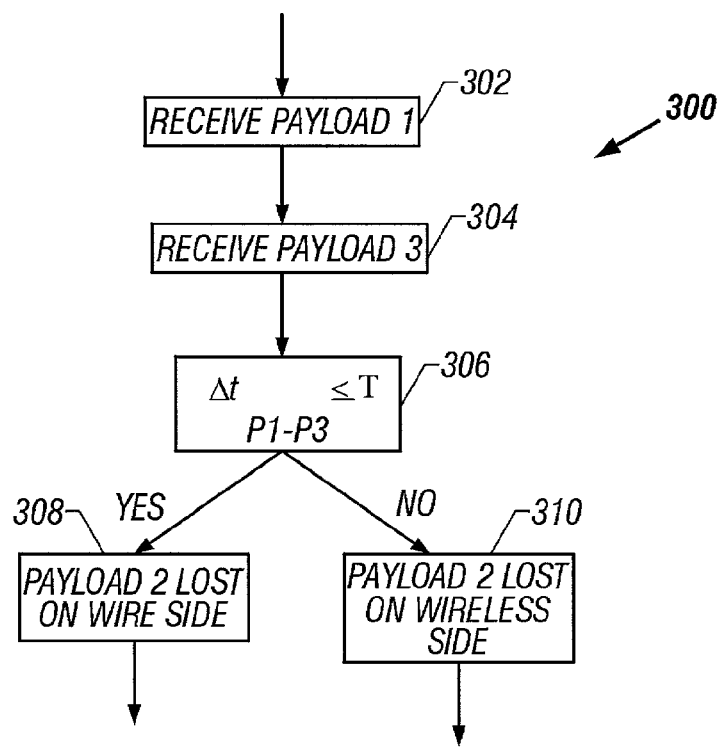
FIG. 3 illustrates a method of determining whether any payload loss in transmission results from wired or wireless portions of a network, for example, the wireless ASP system of FIG. 1, according to embodiments of the present invention.

Referring to FIG. 3, a method 300, performable by communications systems such as the wireless ASP system 10 of FIG. 1, allows the client 202 and the server 204 to make real time, on the fly, adjustments to avoid or correct payload communication loss. Initially, the GSN of each payload provides the client 204 with sequencing information for the respective payloads. If the client 204 receives Payload 1 and Payload 3 (shown in FIG. 2), but does not receive Payload 2 (shown in FIG. 2), then the system 200 determines, that a payload was lost because the GSN's are not in sequence. The determination of which, if any, payloads are lost (i.e., by virtue of out of sequence GSNs) can be made at times appropriate in view of the effective data rates for the client 204 receipts and the server 202 transmits, as hereafter further detailed.

In a step 302, the client 204 receives Payload 1. Thereafter, in a step 304, the client receives Payload 3. In a next step 306 occurring at a time differential of Δt between the respective receipts of the Payload 1 and the Payload 3 by the client 204, if the client 204 has not yet received the Payload 2, then the Payload2 is assumed as lost by the client 204. The client 204 then makes an assessment whether the Payload 2 was lost on the wired portions of the network 206 or the wireless portions of the network 206. If the differential of Δt exceeds a time T of some multiple of the effective data transmit rate of the server 202, then the client 204 assumes that Payload 2 was lost on the wire side. If, on the other hand, the differential of Δt is less than or equal to time T, then the client 204 assumes that the Payload 2 was lost on the wireless side. In either event, the client 204 responds to the server 206 with a request to re-send only those payloads which have not been received by the client 204. The GSN sequence indicates to the client 204 which payloads have not been received, and the client 204 notifies the server 202 accordingly.

By assessing in such manner that any loss is due to a particular physical portion of the network 206, communications regarding the particular portion can be made between the client 204 and the server 202. The client 204 and the server 202 can each make appropriate changes to operations in order to account for and remedy the loss. Although a wide variety of changes to operations and other control mechanisms are possible by use of the foregoing method 300 to assess data loss, certain possibilities are later described herein.

Header Bundling

Figure 4:
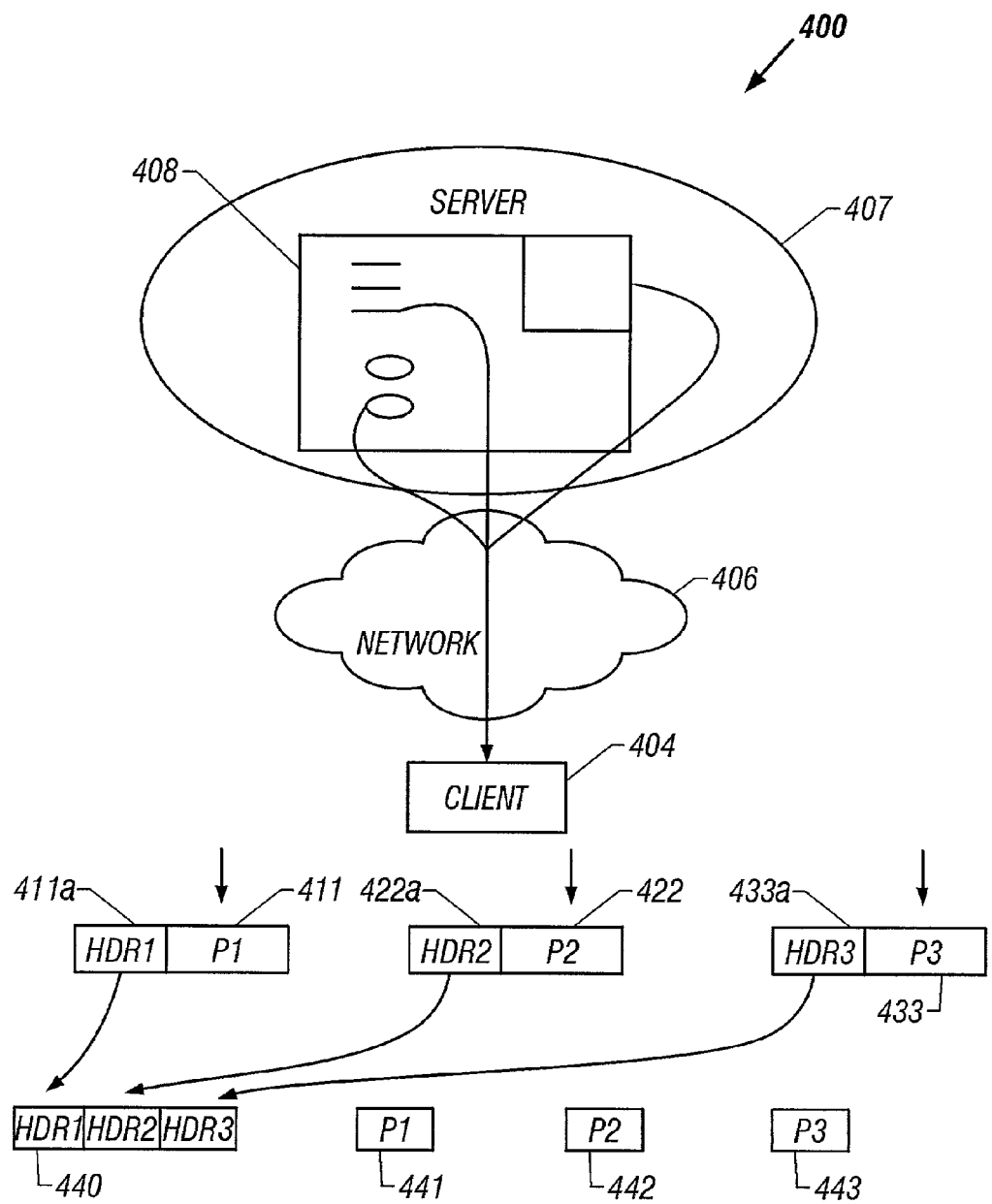
FIG. 4 illustrates a client-server network wherein headers of data payloads are compressed together and transmitted by the server to the client in such manner, according to embodiments of the present invention.

Referring to FIG. 4, a system 400 illustrates speeding of communications over a communications network, such as that of the wireless ASP system of FIG. 1, by bundling data headers. In the system 400, a server 402 communicates with a client 404 over a network 406. As with the systems previously mentioned, the server 402 and the client 404 are communications devices capable of communicating packetized data using protocols, either standard or proprietary, of the network 406. The network 406 is any communications network, such as, for example, the Internet, and can include any of a variety of physical communications channels, including wired channels and wireless channels.

At the server 402, information 408 that is comprised of several payloads, such as a web page including several files, data types, and the like, are communicated by the server 402 over the network 406 to the client 404. Various compression of the information 408 can occur at the server 402 (or elsewhere) prior to the server 402 sending the information 408 to the client 404. The information 408 can pass over the network 406 in compressed form, and the client 404 decompresses the information 408 once received by it.

In the system 400, headers 411a, 422a, 433a of each payload 411, 422, 433 of the information 408 are compressed together as a single payload, separate from the corresponding payloads 411, 422, 433. The payload 440 of compressed headers is transmitted by the server 402 to the client 404 over the network 406. The separate payloads 441, 442, 443 of the compressed payloads 411, 422, 433 are also transmitted by the server 402 to the client 404. The payload 440 of the compressed headers saves bandwidth in transmission because the amount of data of the payload 440 is reduced through the compression, in relation to the amount of data if the headers are each separately compressed and transmitted.

Figure 5:
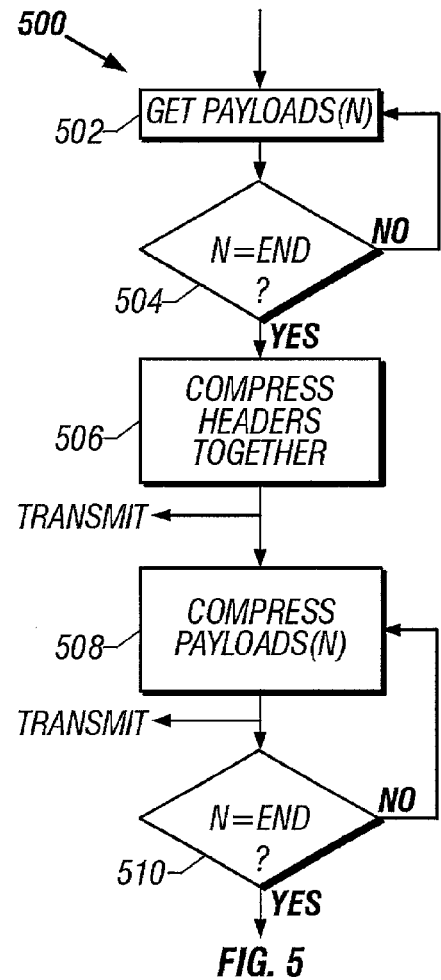
FIG. 5 illustrates a method for compressing and transmitting headers of data payloads, together, according to embodiments of the present invention.

Referring to FIG. 5, a method 500 bundles headers of payloads and payloads themselves, and compresses and transmits the payloads. In the method 500, the information 408, for example, a web page, includes various data types and files. Each type or file is a payload to the server 402. In a step 502, the server 402 gets the payloads by a "Get" command requesting the particular data type or file. In a next step 504, a determination is made whether all payloads have then been obtained by the server 402. If all payloads have not then been obtained, the method 500 returns to the step 502.

If all payloads have then been obtained by the server 402, the headers of all the payloads are together compressed in a step 506. The compressed headers are transmitted to the client 406.

In a step 508, the payloads previously received by the server 402 are each separately compressed without the headers. After compressed, each payload is transmitted by the server 402 to the client 406. A next step 510 checks to determine whether or not all payloads have been compressed and transmitted. If not, the method 500 returns to the step 508. Otherwise, the method ends.

Bundling Rate

Figure 6:
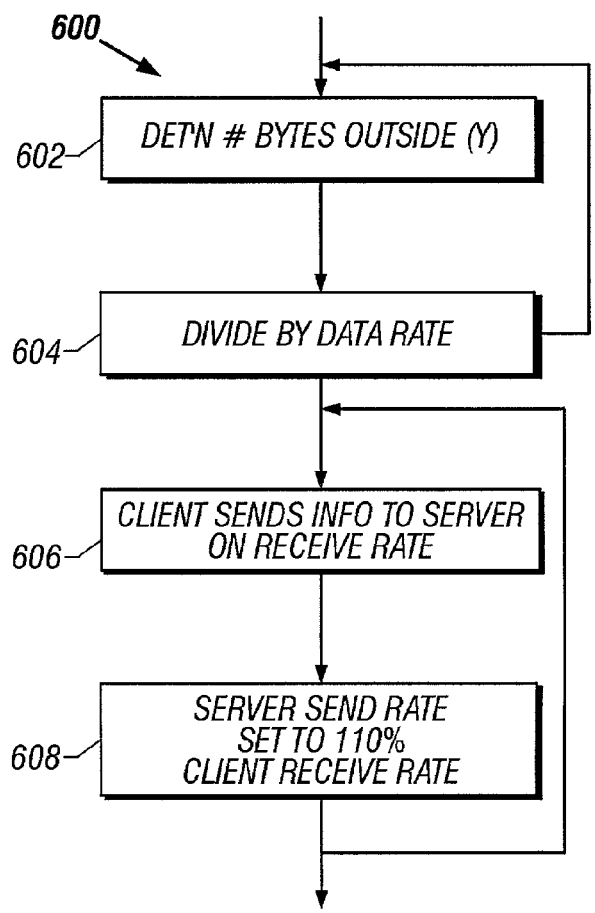
FIG. 6 illustrates a method of setting a server send rate based on operations at the client, according to embodiments of the present invention.

Referring to FIG. 6, a method 600 determines a server send rate to better assure that all communicated information 408 is received by the client 404 from the server 402. In the method 600, a step 602 determines the number of bytes outstanding to be received by the client 404. The step 602 can be performed by the client 404, the server 402, or otherwise, by communications therebetween indicating the receipts by the client 404. In a next step 604, an effective data rate of receipt of data by the client 404 is determined and the number of outstanding bytes is divided by the data rate. This operation is performable at the client 404, the server 402, or otherwise, by communications therebetween.

The division operation in the step 604 gives the client receive rate, i.e., time to wait "T". The time to wait T is the amount of time which the server 402 should wait before sending the next successive payload to the client 404. The time to wait T is communicated to the server 402 by the client 404 in a step 606. Based on the time to wait T, the server 402 then sets its send rate in step 608. The server 402 send rate is set to a multiple of the time to wait T, such as, for example, the server 402 send rate is set to about 110% of the time to wait T.

The method 600 better assures that the server 402 send rate comports with the client 404 receive rate and that all data will be appropriately received by the client 404. It is understandable that the method 600 in conjunction with the GSNs of payloads and the methods 300, 500 provides dynamic, real time adjustments and changes to networks and elements, in order to better assure effective data communications between client and server. Furthermore, the systems and methods, implemented in conjunction with the protocols of the related patent applications, provide checks and constraints for operations of the protocols.

In operation of the systems 10, 200, 400 and the methods 300, 500, 600, numerous alternative business and technical arrangements are possible. In certain embodiments of a wireless ASP system 10, an administrator of the wireless ASP server computer 16 can provide select interfaces and content to the wireless device 20 or other client device of the network. For example, the wireless device 20 can be equipped with a form of World Wide Web (WWW) browser that performs according to the specialized protocols for the communications between the wireless device 20 and the wireless ASP server computer 16. In such instance, the wireless ASP server computer 16 can provide to the wireless device 20 according to those same specialized protocols various data and information, including such things as graphics, images, voice, text, and other digitally represented information and matters.

The wireless ASP server computer 16 must also, however, be capable of communicating via typical network protocols with other network connected devices in order to receive and deliver messages from and to those network connected devices, and then transfer those messages on or receive those messages from the wireless device 20, as appropriate.

Although only particular devices of a communications network and its nodes are herein described and discussed, particularly, wireless device 20, the wireless ASP server computer 16, the wireless service provider 18, the server computer 14, and the network, such as the Internet 12, have been described with regard to the embodiments, it is to be expressly understood that combinations of those elements, such as a plurality of any, certain ones, all of those elements, and even additional or alternative elements, is possible in keeping with the scope of the embodiments herein. The network could be an intranet, or even an intranet combination or intranet-extranet combination. Numerous banks of the wireless ASP server computer 16 can be possible for receiving communications from pluralities of wireless devices, and the wireless ASP server computers can be centrally located or distributed through a wide geographic area. In the case of a global network such as the Internet, the network is capable of communicating by its protocols, which may include other specialized protocols for specific situations. The wireless ASP server computer in such instance can communicate with various devices on the network according to those other specialized protocols, if properly equipped as would be known to those skilled in the art. In general, the communications between the wireless device or devices and the wireless ASP server computer or computers occurs according to optimized protocols for wireless communications. These optimized protocols can be implemented entirely in software or alternatively can be hardware, combinations of hardware and software, or other mechanisms. The protocols of the hardware or software, as the case may be, for the wireless communications will, in any event, provide increased communications efficiency, speed, and adaptation for the wireless environment.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wireless communications network for communicating a data payload, the data payload comprised of data packets, each of the data packets of format for communication over the network, the data payload includes a distinct data type element, the distinct data type element is one of a plurality of data type elements to be sequentially communicated over the network, comprising:

a wired network;

a wireless channel;

a server computer connected to the wired network;

a wireless packetized data communications provider equipment connected to the wired network;

a client device communicatively connected via the wireless channel to the wireless packetized data communications provider; and a unique global sequence number identifying the data payload, the unique global sequence number being assigned by the server computer to the data payload and included by the server computer in at least one data packet comprising the data payload;

wherein the data payload is communicated on the wireless channel, together with the unique global sequence number as part of the data payload;

the data payload including a header, the data payload is one of a plurality of data payloads having respective headers for communication over the network, further comprising a compressor for compressing together the header of the data payload with other headers of the other data payloads for communication; and a comparator for determining whether a time differential between receipts by the client device of every other sequential one of the data payloads exceeds a time constant indicative of an effective data receipt rate of the client device.

2. The wireless communications network of claim 1, wherein the compressor is the server computer.

3. A wireless communications network for communicating a data payload, the data payload comprised of data packets, each of the data packets of format for communication over the network, the data payload includes a distinct data type element, the distinct data type element is one of a plurality of data type elements to be sequentially communicated over the network, comprising:

a wired network;

a wireless channel;

a server computer connected to the wired network;

a wireless packetized data communications provider equipment connected to the wired network;

a client device communicatively connected via the wireless channel to the wireless packetized data communications provider; and a unique global sequence number identifying the data payload, the unique global sequence number being assigned by the server computer to the data payload and included by the server computer in at least one data packet comprising the data payload;

wherein the data payload is communicated on the wireless channel, together with the unique global sequence number as part of the data payload;

the data payload being one of a plurality of data payloads communicated over the network to the client device by the server computer, further comprising a comparator for determining whether a time differential between receipts by the client device of every other sequential one of the data payloads exceeds a time constant indicative of an effective data receipt rate of the client device.

4. The wireless communications network of claim 3, wherein the comparator is selected from a group consisting of: a software and a hardware at the client device.

5. A wireless communications network for communicating a data payload, the data payload comprised of data packets, each of the data packets of format for communication over the network, the data payload includes a distinct data type element, the distinct data type element is one of a plurality of data type elements to be sequentially communicated over the network, comprising:

a wired network;
a wireless channel;
a server computer connected to the wired network;
a wireless packetized data communications provider equipment connected to the wired network;
a client device communicatively connected via the wireless channel to the wireless packetized data communications provider;
a unique global sequence number identifying the data payload, the unique global sequence number being assigned by the server computer to the data payload and included by the server computer in at least one data packet comprising the data payload;
wherein the data payload is communicated on the wireless channel, together with the unique global sequence number as part of the data payload; and
a bundling rate determiner at the client device, wherein an outstanding number of bytes not yet received by the client device is divided by an effective data receipt rate of the client device, and the server computer adjusts a send rate of the server computer based on a multiple of the result of the division.

6. A method of wireless communications of a data payload of a plurality of data payloads for communication, the data payload includes data packets of format for communication over the network, the data payload includes a distinct data type element, the distinct data type element is one of a plurality of data type elements to be sequentially communicated over the network, comprising the step of:

assigning the data payload a unique global sequence number;
including the unique global sequence number in at least one data packet comprising the data payload;
transmitting the data payload together with the unique global sequence number;
receiving a next successive one of the data payloads;
determining a time differential between receipts of the next successive one; and
comparing the time differential to a time of a multiple of a server transmit rate;
wherein if the time differential exceeds the time of the multiple then a payload loss is assumed occurring on a wireless portion of a network and otherwise on a wired portion of the network.

* * * * *